US008812605B2

(12) United States Patent
Zhang

(10) Patent No.: US 8,812,605 B2
(45) Date of Patent: Aug. 19, 2014

(54) METHOD FOR A MOBILE EMAIL CLIENT TO ACCESS TO A SERVER, AND MOBILE TERMINAL THEREOF

(75) Inventor: Ju Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 54 days.

(21) Appl. No.: 13/636,696

(22) PCT Filed: May 21, 2010

(86) PCT No.: PCT/CN2010/073088
§ 371 (c)(1),
(2), (4) Date: Sep. 24, 2012

(87) PCT Pub. No.: WO2011/116546
PCT Pub. Date: Sep. 29, 2011

(65) Prior Publication Data
US 2013/0013722 A1 Jan. 10, 2013

(30) Foreign Application Priority Data
Mar. 26, 2010 (CN) .......................... 2010 1 0136074

(51) Int. Cl.
G06F 15/16 (2006.01)
H04L 12/58 (2006.01)
H04W 76/02 (2009.01)
H04W 4/12 (2009.01)
(52) U.S. Cl.
CPC ............ H04L 12/5895 (2013.01); H04L 51/38 (2013.01); H04W 76/02 (2013.01); H04W 4/12 (2013.01)
USPC ........................... 709/206; 709/227; 709/228

(58) Field of Classification Search
CPC ... H04L 12/5895; H04L 51/38; H04W 76/02; H04W 4/12
USPC .................................. 709/206, 227, 237, 228
See application file for complete search history.

(56) References Cited

U.S. PATENT DOCUMENTS 7,418,256 B2 * 8/2008 Kall et al. ...................... 455/411
2002/0159387 A1 * 10/2002 Allison et al. ................. 370/229

(Continued)

FOREIGN PATENT DOCUMENTS

CN  1561076 A  1/2005
EP  2099181 A2  9/2009

(Continued)

OTHER PUBLICATIONS

International Search Report in international application No. PCT/CN2010/073088, mailed on Jan. 6, 2011.

(Continued)

Primary Examiner — Kostas Katsikis
(74) Attorney, Agent, or Firm — Oppedahl Patent Law Firm LLC

(57) ABSTRACT

Disclosed are a method for communications between a terminal and a base station. The method comprises: determining a type of an access point that connects the mobile email client and the server according to information of the access point; establishing a data link between the mobile email client and the server according to the determined type of the access point; performing data exchange between the mobile email client and the server. The solution enables a mobile terminal to send and receive mobile emails as long as the access point is an access point that the mobile emails can use, no matter what kind of access point that the user selects, and no matter what kind of access point that the client account configuration information, which is transmitted by a mobile operator, adopts, thereby ensuring the normal use of the mobile email in a mobile terminal better.

11 Claims, 4 Drawing Sheets

(56) References Cited

U.S. PATENT DOCUMENTS

| | | |
|---|---|---|
| 2003/0119527 A1* | 6/2003 | Labun et al. ............... 455/456 |
| 2003/0135560 A1* | 7/2003 | Bodin et al. ............... 709/206 |
| 2006/0155811 A1* | 7/2006 | Goh et al. ............... 709/206 |
| 2007/0033197 A1* | 2/2007 | Scherzer et al. ............ 707/10 |
| 2007/0055775 A1* | 3/2007 | Chia ........................... 709/225 |
| 2007/0140189 A1 | 6/2007 | Muhamed |
| 2007/0162341 A1* | 7/2007 | McConnell et al. .......... 705/14 |
| 2007/0299918 A1* | 12/2007 | Roberts ...................... 709/206 |
| 2008/0201201 A1* | 8/2008 | Pousti et al. ............... 705/10 |
| 2008/0215684 A1* | 9/2008 | Thorkelsson et al. ....... 709/206 |
| 2009/0006644 A1 | 1/2009 | Forstall |
| 2009/0092080 A1 | 4/2009 | Balasubramanian |
| 2009/0157831 A1* | 6/2009 | Tian et al. ............... 709/206 |
| 2010/0099405 A1* | 4/2010 | Brisebois et al. ............ 455/434 |
| 2013/0084823 A1* | 4/2013 | Glass et al. ............... 455/404.1 |

FOREIGN PATENT DOCUMENTS

| | | |
|---|---|---|
| WO | WO 2006028419 A1 * | 3/2006 |
| WO | 2009005847 A1 | 1/2009 |
| WO | 2009048803 A1 | 4/2009 |

OTHER PUBLICATIONS

English Translation of the Written Opinion of the International Search Authority in international application No. PCT/CN2010/073088, mailed on Jan. 6, 2011.

Supplementary European Search Report in European application No. 10848208.4, mailed on Mar. 31, 2014.

* cited by examiner

METHOD FOR A MOBILE EMAIL CLIENT TO ACCESS TO A SERVER, AND MOBILE TERMINAL THEREOF

TECHNICAL FIELD

The present application relates to the field of data communication, and in particular to a method for a mobile email client to access to a server, and mobile terminal thereof.

BACKGROUND

With the development of communication technology and electronic commerce, email has been increasingly placed into application in the mobile terminal, herein referred to as mobile email. Mobile email brings great convenience to email checking, receiving and transmitting. By mobile email, a user can receive and transmit mobile emails with ease and speed, read emails off-line and leave mobile emails on the mobile email server. However, compared with webpage browsing manners, receiving and transmitting emails on the mobile terminal with such mobile email manner requires more account information to be configured by the user, which makes it difficult to configure the account correctly and inconveniences the effective use of the mobile email.

In view of the difficulty in configuring the account, many mobile operators provide an additional value-added service, by which a user simply sends a short message to the mobile operator for subscribing to the mobile email service, the mobile operator then sends the information associated with configuring the mobile email account to the user mobile terminal, then the user mobile terminal decodes the received account information and establishes the user account at the mobile terminal. In this way, the user operations are reduced, and the user can receive and transmit mobile emails without configuring the mobile email account manually.

For the mobile email service, different mobile operators utilize different default wireless access points. Even for the same mobile operator, one or more access points can be available to provide the mobile email service. Based on the plurality of access points provided to the mobile email client by the mobile operators, some of the plurality of access points use a same link, wherein they are the same, and they are called indiscrimination access; while some of some of the plurality of access points use different links, and they are called discrimination access. If a mobile terminal only supports communication between the mobile email client and the server through an access point A, while the mobile email account configuration information sent by the mobile operator uses an access point B by default, once the access point A and the access point B are discrimination access, then the account information sent by the mobile operator cannot be used to configure a client account on a mobile terminal, and the mobile terminal cannot receive and transmit the mobile emails either.

SUMMARY OF DISCLOSURE

With respect to the technical problem in the prior art that the mobile email configuration information may not be consistent with an access point that a mobile terminal supports, such that the mobile terminal can not use the mobile email feature, the present disclosure aims to provide a method for a mobile email client to access to a server, and a mobile terminal thereof, which can more effectively ensure the normal use of the mobile email feature.

The claimed solution herein includes:

A method for a mobile email client to access to a server, including:

a type of an access point is determined that connects the mobile email client and the server according to information of the access point;

a data link is established between the mobile email client and the server according to the determined type of the access point;

data exchange is performed between the mobile email client and the server.

the step of determining the type of the access point that connects the mobile email client and the server may include:

the information of the access point is read that establishes the data link between the mobile email client and the server according to account information configured in the mobile email client; and it is determined whether the type of the access point is a network net/web access, or a wireless application protocol (WAP) access.

when the type of the access point is determined to be the network net/web access, the step of establishing the data link between the mobile email client and the server may include:

the data link is established between the mobile email client and the server directly.

And when the type of the access point is determined to be the WAP access, the step of establishing the data link between the mobile email client and the server may include:

the mobile email client is connected to the server directly, and the data link is established between the mobile email client and the server directly when the server returns a correct response; and the data link is established between the mobile email client and the server through a gateway when the server returns an incorrect response.

The step of establishing the data link between the mobile email client and the server through the gateway may include:

the mobile email client transmits a Hypertext Transfer Protocol (HTTP) CONNECT instruction carrying information of the mobile email server to the gateway; and the data link is established between the mobile email client and the server through the gateway when the gateway returns the correct response.

The information of the gateway may be included in the information of the access point.

After the step of establishing the data link between the mobile email client and the server, the method further may include:

It is determined whether or not the data exchange between the mobile email client and the server requires use of Secure Sockets Layer (SSL) protocol;

if yes, then a handshake negotiation is performed between the mobile email client and the server before the data exchange; and if not, then the data exchange is performed between the mobile email client and the server directly.

A mobile terminal supporting a mobile email function, at least including a module for determining a type of an access point, a module for establishing a data link and a module for performing data exchange, wherein:

the module for determining a type of an access point is configured to determine a type of an access point that connects a mobile email client and a server;

the module for establishing a data link is configured to establish a data link between the mobile email client and the server according to the type of the access point determined by the module for determining a type of an access point; and the module for performing data exchange is configured to perform data exchange between the mobile email client and the server via the established data link.

The module for determining a type of an access point may specifically be configured to read account information configured in the mobile email client and thereby determining the type of the access point.

The type of the access point may include a net/web access and a WAP access;

The module for establishing a data link may further be configured to establish the a data link between the mobile email client and the server directly when the type of the access point is the net/web access; and determine whether or not the mobile email client and the server require a gateway for establishing the data link when the type of the access point is the WAP access.

The mobile terminal may further include a module for gateway connection, configured to establish the data link between the mobile email client and the server when the mobile email client and the server require a gateway for establishing the data link.

The module for performing data exchange may further be configured to determine whether or not the data exchange between the mobile email client and the server requires use of the SSL protocol;

if yes, then a handshake negotiation is performed between the mobile email client and the server before the data exchange; and if not, then the data exchange is performed between the mobile email client and the server directly.

The solution of the present disclosure enables a mobile terminal to send and receive mobile emails as long as the access point is an access point that mobile emails can make use of, no matter what kind of access point that the user selects and no matter what kind of access point that the client account configuration information, which is transmitted by a mobile operator, adopts, thereby ensuring the normal use of the mobile email in a mobile terminal better.

DETAILED DESCRIPTION OF THE EMBODIMENTS

With respect to the technical problem in the prior art that the mobile email configuration information may not be consistent with an access point that a mobile terminal supports, such that the mobile terminal can not use the mobile email feature, the present disclosure aims to provide a technical solution, wherein the core idea is that: firstly, a type of an access point is determined that connects the mobile email client and the server according to account information configured in the mobile email client, then a data link is established between the mobile email client and the server according to the type of the access point, and the transmitting and receiving of mobile emails are performed.

Figure 1:
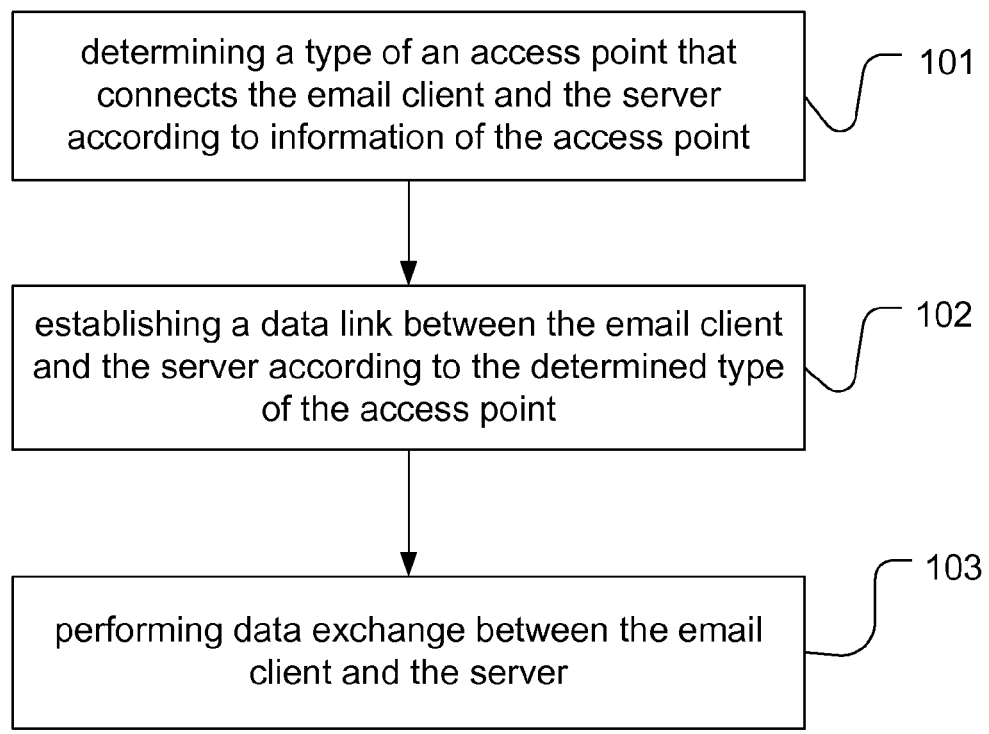
FIG. 1 is a flowchart of the method for a mobile email client to access to a server in the disclosure.

The claimed solution will be further described in conjunction with the accompanying drawings as follows:

FIG. 1 is a flowchart of the method for a mobile email client to access to a server in the disclosure, as illustrated in FIG. 1, the method includes the steps of:

Step 101: determining a type of an access point that connects a mobile email client and a server according to information of the access point.

The information of the access point is contained in account information configured for the mobile email client, which is either configured manually by the user or configured automatically by configuration information carried in a short message transmitted by the mobile operator to the user. A mobile email client can be configured with a plurality of accounts information, whereas only one of the plurality of accounts can be activated and becomes the currently used account.

The configured account information includes information of the access point, server address and server port number. When the mobile operator transmits configuration information to the user, the account becomes the currently activated account. The information of the access point contains a type of the access point, and gateway information to be used when accessing via a gateway.

Step 102: establishing a data link between the mobile email client and the server according to the type of the access point.

The type of an access point for a mobile email client can be divided into two types, i.e., the network access, such as a net access point (or a web access point), and the wireless application protocol access, such as a WAP access point. If a configured account uses a WAP access point, since some mobile email clients using the WAP access point have to connect to the server via a gateway, and some mobile email clients using the WAP access point do not have to connect via a gateway, it is necessary to first connect the mobile email clients with the server. If the connecting succeeds, a data link can be established without a gateway, and if the connecting fails, the data link between the mobile email client and the server is established according to the gateway information contained in the information of the access point.

Step 103: performing data exchange between the mobile email client and the server.

After establishing the data link between the mobile email client and the server, the client can exchange data with the server, thereby receiving and transmitting mobile emails. Receiving and transmitting mobile emails have to be based on the relevant email receiving and transmitting protocols, such as Simple Mail Transfer Protocol/Extended Simple Mail Transfer Protocol (SMTP/E SMTP), Post Office Protocol Version 3 (POP3), or Internet Message Access Protocol Version 4 (IMAP4) etc.

Figure 2:
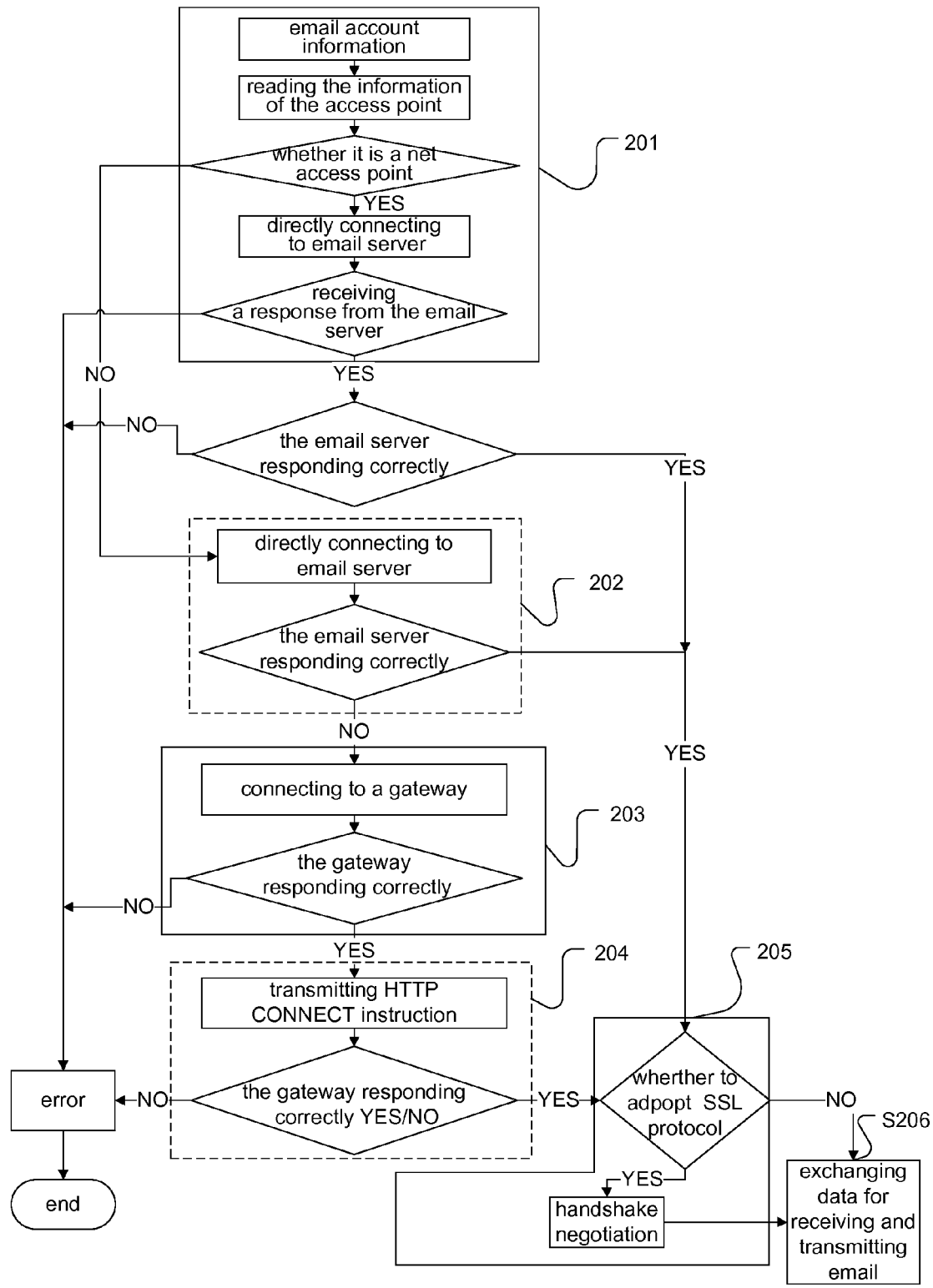
FIG. 2 is a flowchart of detailed description of accessing the mobile email client to the server in the disclosure.

FIG. 2 is a flowchart of detailed description of accessing the mobile email client to the server in the disclosure. As illustrated in FIG. 2, an embodiment according to the present disclosure is described as follows:

Step 201: the mobile email client reads the information of the access point contained in the account information according to the configured account information.

In this step, the account is either configured manually by the user or automatically configured by configuration information carried in a short message transmitted by the mobile operator to the user. The configured account information includes the information of the access point, server address and server port number. The information of the access point includes a type of the access point, and gateway information to be used when accessing via a gateway. If the type of access point that is read from the account information is a net access (or a web access), the mobile email client directly connects to the server according to the server address and the server port number contained in the account information. After the connection established, if a response is not received from the server, or an incorrect response is received from the server, which indicates that the configuration failed, then the mobile email client fails to connect to the server normally, and the whole process ends; And if a correct response is received from the mobile email server, then a data link has been established between the mobile email client and the server. Thus, mobile emails may be received and transmitted. Subsequently, the process proceeds to Step 205. Alternatively, if the information of the access point that is read from the configured account information is of WAP access point, then the process proceeds to Step 202.

Step 202: directly connecting the mobile email client to the client according to the server address and the server port number contained in the configured account information. If the server returns a correct response, it indicates that the mobile email client and the server can establish the link without requiring a gateway. In this circumstance, the mobile email client and the server can perform the receiving and transmitting of the mobile emails, and the process proceeds to Step 205. However, if the server returns an incorrect response or returns no response, this indicates that the mobile email client can not directly connect to the server, and a gateway is required for performing the connection, the process proceeds to Step 203.

Step 203: establishing the data link between the mobile email client and the server through a gateway. According to the gateway information that is read from the information of the access point, the data link between the mobile email client and the server is established through a gateway. If the gateway returns an incorrect response indicating the account configuration fails, the data link between the mobile email client and the server can not be established, then the process ends. And if the gateway returns a correct response, then the process proceeds to Step 204.

Step 204: the mobile email client transmits Hypertext Transfer Protocol connect (HTTP CONNECT) instruction, which carries information of the server address and server port number etc., to the gateway. After the gateway receives the above instruction, if it returns an incorrect response, then it indicates that establishment of the data link fails and a failure occurs on the account configured by the user, and the data link between the mobile email client and the server can not be established; however, if it returns a correct response, then it indicates that the data link between the mobile email client and the server has been established through the gateway, and the mobile email client and the server can perform data exchange through the gateway. Accordingly, the process proceeds to Step 205 to perform the data exchange.

Step 205: determining whether or not the data exchange between the mobile email client and the server requires use of Secure Sockets Layer (SSL) protocol according to the configured account information. The server decides whether the SSL protocol is required. The field "EMAL_SSLTYPE ssltype" contained in the configured account information indicates that whether the SSL protocol is required to perform the data exchange between the mobile email client and the server. The ssltype in "ssltype" of the field "EMAL_SSLTYPE ssltype" has 4 type of values, i.e., ssltype (0, 1, 2, 3), which respectively indicate: SSL protocol unused, SSL protocol used to transmit mobile emails, SSL protocol used to both receive and transmit mobile emails.

If it determined that the SSL protocol is required, the process proceeds to a handshake negotiation between the mobile email client and the server. The handshake negotiation is a part of the SSL protocol and belongs to the prior art, which is not described in detail herein. In particular, for a data link requiring a gateway between the mobile email client and the server, the handshake negotiation of the mobile email client and the server should use a gateway for the transfer. When the handshake negotiation is completed, after the mobile email client receives a response from the server indicating the negotiation is successful, the process proceeds to Step 206.

If it is determined that the SSL protocol is not required, then the process proceeds to Step 206.

Step 206: the mobile email client and the server performing data exchange of receiving and transmitting of mobile emails according to protocols for receiving and transmitting of mobile emails. The protocols for receiving and transmitting of mobile emails include the Simple Mail Transfer Protocol/Extended Simple Mail Transfer Protocol (SMTP/E SMTP), Post Office Protocol Version 3 (POP3), or Internet Message Access Protocol version 4 (IMAP4), etc., and the kind of protocol for receiving and transmitting of mobile email depends on the server itself, and it belongs to prior art and is not described in detail herein.

Figure 3:
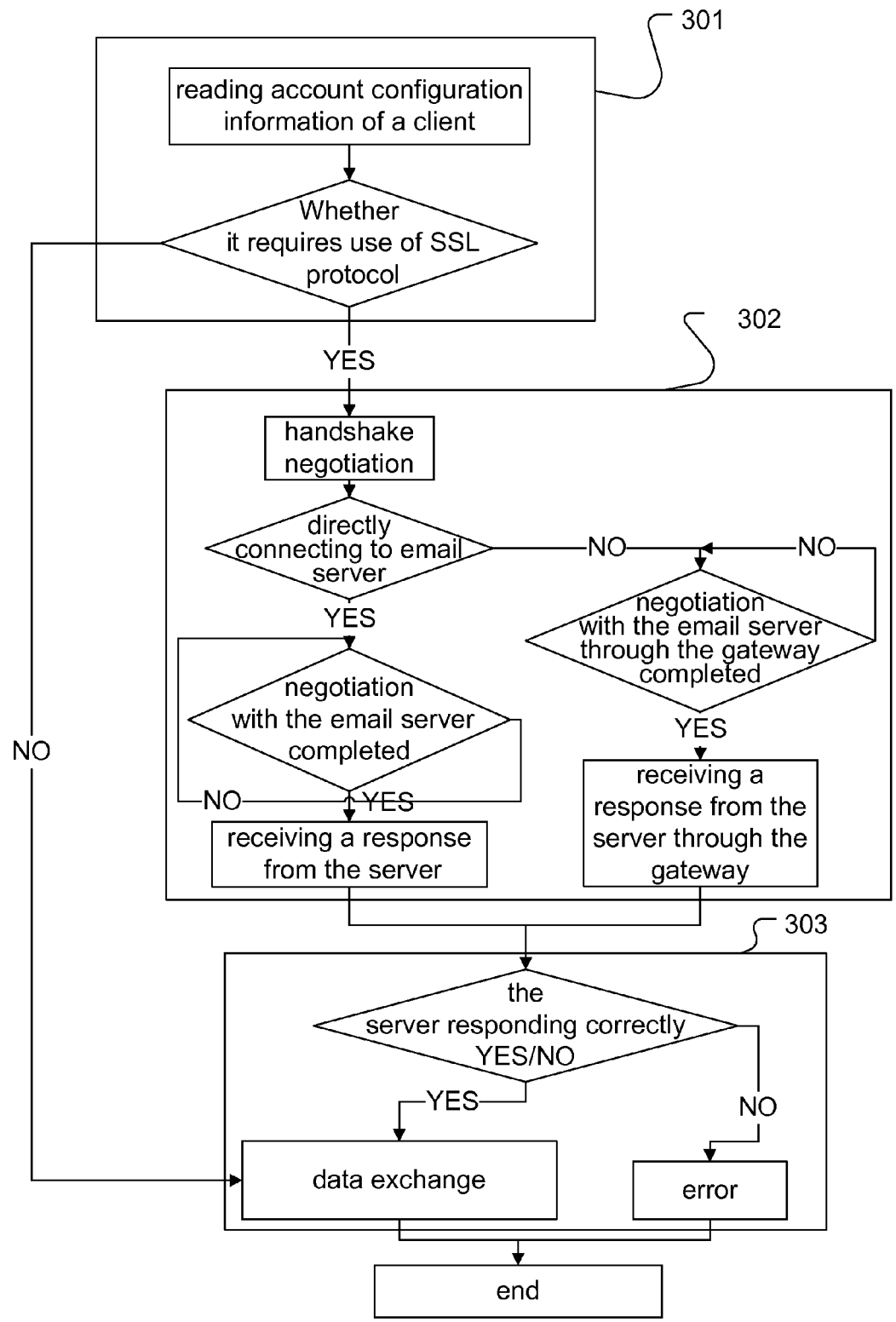
FIG. 3 is a flowchart of data exchanging after accessing the mobile email client accesses to the server in detailed description in the disclosure.

FIG. 3 is a flowchart of data exchanging after accessing the mobile email client accesses to the server in detailed description in the disclosure. As illustrated in FIG. 3, the data exchange process specifically includes:

Step 301: the mobile terminal reading the account information configured in the mobile email client and determining whether or not use of a SSL protocol is required. For the details of the determining process, please refer to the specific description in Step 205 of FIG. 2, which are not repeated herein. If the use of a SSL protocol is not required, the process proceeds to data exchange between the mobile email client and the server. And if the use of a SSL protocol is required, then the process proceeds to Step 302.

Step 302: performing the process of handshake negotiation, and determining whether the mobile email client require a gateway for connecting to the server. If a gateway is required to establish the data link between the mobile email client and the server, the mobile email client negotiates with the server through the gateway, and the process proceeds to Step 303 upon receiving a response from the server. And if a gateway is not required, then the mobile email client directly negotiates with the server and the process proceeds to Step 303 upon receiving a response from the server.

Step 303: determining whether nor not the server responds correctly. When the correct response from the server indicating that the negotiation is successful is received, the process proceeds to the data exchange between the mobile email client and the server. If an incorrect response is received, which indicates that the negotiation failed, the mobile email client and the server can not perform the data exchange.

Figure 4:
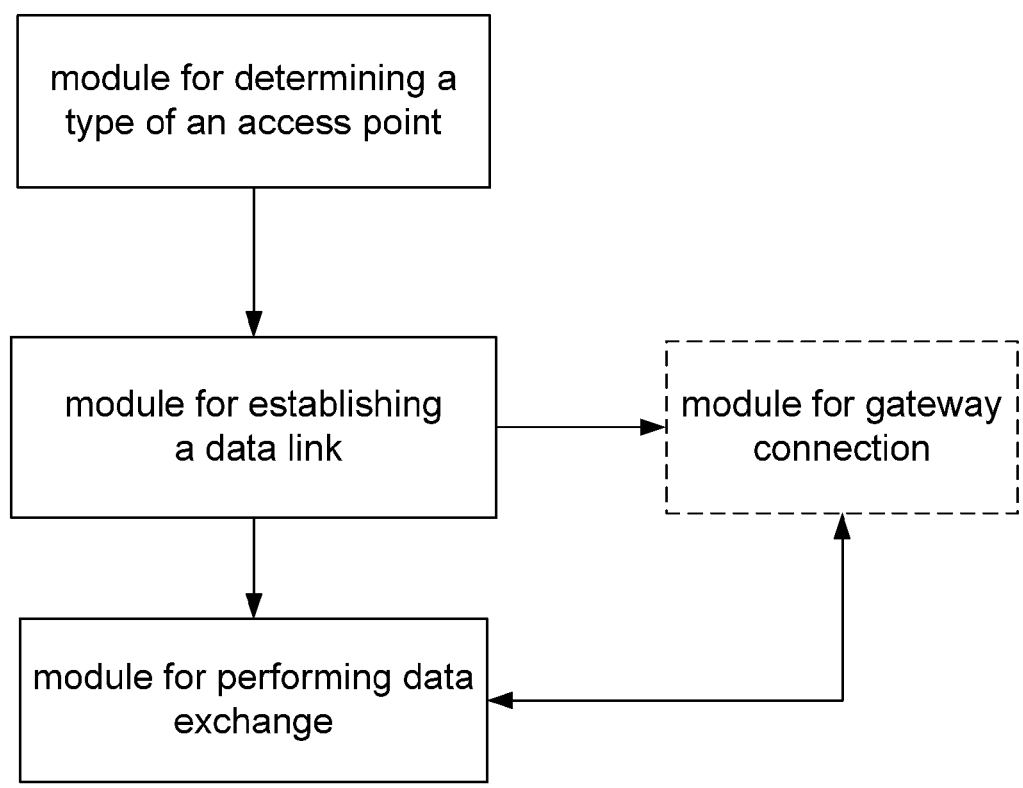
FIG. 4 is a structural diagram illustrating mobile terminals supporting the mobile email feature in the disclosure.

FIG. 4 is a structural diagram illustrating mobile terminals supporting the mobile email feature in the disclosure. As illustrated in FIG. 4, the email terminal of the present disclosure may at least include a module for determining a type of an access point, a module for establishing a data link and a module for performing data exchange. And preferably, the email terminal may further include a module for gateway connection.

The module for determining a type of an access point is configured to determine a type of an access point that connects a mobile email client and a server. The access point types that a mobile email client supports is contained in the information of the access point of the configured account information. The account is either configured manually by the user or configured automatically by configuration information carried in a short message transmitted by the mobile operator to the user. The configured account information contains server address and server port number. The information of the access point contains a type of an access point and the gateway information required when accessing via a gateway.

The module for establishing a data link is configured to establish a data link between the mobile email client and the server according to the type of the access point determined by the module for determining a type of an access point. If the type of the access point that is reads from the account information is a net access (or a web access), the mobile email client directly connects to the server according to the server address and the server port number. Alternatively, if the information of the access point that is read from the configured account is a WAP access point, initiate direct connecting the mobile email client to the server. If the connecting succeeds, a data link can be established without a gateway, and if the connecting fails, then the data link between the mobile email client and the server is established via a gateway according to the gateway information in the information of the access point.

The module for gateway connection is configured to establish the data link between the mobile email client and the server via a gateway when the mobile email client and the server require a gateway for establishing the data link.

When the data link is to be established between the mobile email client and the server via a gateway, the mobile email client transmits Hypertext Transfer Protocol connect (HTTP CONNECT) instruction, which carries information of the server address and server port number etc., to the gateway. After the gateway receives the above instruction, if it returns an incorrect response, then it indicates that establishment of the data link fails and a failure occurs on the account configured by the user, and the data link between the mobile email client and the server can not be established; however, if it returns a correct response, then it indicates that the data link between the mobile email client and the server has been established via the gateway, and the mobile email client and the server can perform data exchange via the gateway.

The module for performing data exchange is configured to perform the data exchange between the mobile email client and the server via the established data link. The email terminal reads the account information configured in the mobile email client, and determines whether a SSL protocol is required. If the SSL protocol is not required, then the mobile email client performs data exchange with the server. And if the SSL protocol is required, then a handshake negotiation is performed, and it is determined whether the mobile email client requires a gateway to be connected to the server.

If a gateway is required for establishing the link between the mobile email client and the server, then the mobile email client negotiates with the server via the gateway, and determines whether the server responds correctly after receiving a response from the server. If a correct response indicating the negotiation is successful is received, then the data exchange of the mobile email client and the server is performed. And if an incorrect response is received from the server, which indicates that the negotiation failed, the mobile email client and the server cannot perform the data exchange.

If use of a gateway is not required, then the mobile email client directly negotiates with the server, and determines whether the server responds correctly after receiving a response from the server. If a correct response indicating the negotiation is successful is received, then the data exchange of the mobile email client and the server is performed. And if an incorrect response is received from the server, which indicates the negotiation fails, the mobile email client and the server cannot perform the data exchange.

All the above describes the preferred embodiments of the present disclosure. It should be noted by those skilled in the art that various modifications and variation can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A method for a mobile email client to access to a server, comprising:
    determining a type of an access point that connects the mobile email client and the server according to information of the access point;
    establishing a data link between the mobile email client and the server according to the determined type of the access point;
    performing data exchange between the mobile email client and the server;
    wherein the step of determining the type of the access point that connects the mobile email client and the server comprises:
    reading the information of the access point that establishes the data link between the mobile email client and the server according to account information configured in the mobile email client; and
    determining whether the type of the access point is a network net/web access, or a wireless application protocol (WAP) access;
    wherein when the type of the access point is determined to be the WAP access, the step of establishing the data link between the mobile email client and the server comprises:
    connecting the mobile email client to the server directly, and establishing the data link between the mobile email client and the server directly when the server returns a correct response; and
    establishing the data link between the mobile email client and the server through a gateway when the server returns an incorrect response.

2. The method according to claim 1, wherein when the type of the access point is determined to be the network net/web access, the step of establishing the data link between the mobile email client and the server comprises:
    establishing the data link between the mobile email client and the server directly.

3. The method according to claim 2, wherein after the step of establishing the data link between the mobile email client and the server, the method further comprises:
    determining whether or not the data exchange between the mobile email client and the server requires use of Secure Sockets Layer (SSL) protocol;
    if yes, then performing a handshake negotiation between the mobile email client and the server before the data exchange; and
    if not, then performing the data exchange between the mobile email client and the server directly.

4. The method according to claim 1, wherein information of the gateway is included in the information of the access point.

5. The method according to claim 1, wherein the step of establishing the data link between the mobile email client and the server through the gateway comprises:
    transmitting, by the mobile email client, a Hypertext Transfer Protocol (HTTP) CONNECT instruction carrying information of the mobile email server to the gateway; and establishing the data link between the mobile email client and the server through the gateway when the gateway returns the correct response.

6. The method according to claim 2, wherein information of the gateway is included in the information of the access point.

7. The method according to claim 5, wherein after the step of establishing the data link between the mobile email client and the server, the method further comprises:
   determining whether or not the data exchange between the mobile email client and the server requires use of Secure Sockets Layer (SSL) protocol;
   if yes, then performing a handshake negotiation between the mobile email client and the server before the data exchange; and
   if not, then performing the data exchange between the mobile email client and the server directly.

8. The method according to claim 1, wherein after the step of establishing the data link between the mobile email client and the server, the method further comprises:
   determining whether or not the data exchange between the mobile email client and the server requires use of Secure Sockets Layer (SSL) protocol;
   if yes, then performing a handshake negotiation between the mobile email client and the server before the data exchange; and
   if not, then performing the data exchange between the mobile email client and the server directly.

9. A mobile terminal supporting a mobile email function, the mobile terminal comprising one or more processors for implementing: a determining module, an establishing module and a performing module, wherein
   the determining module is configured to determine a type of an access point that connects a mobile email client and a server;
   the establishing module is configured to establish a data link between the mobile email client and the server according to the type of the access point determined by the module for determining a type of an access point; and
   the performing module is configured to perform data exchange between the mobile email client and the server via the established data link;
   wherein the determining module is configured to read account information configured in the mobile email client and thereby determining the type of the access point; wherein the type of the access point comprises a net/web access and a WAP access;
   the establishing module is further configured to establish the data link between the mobile email client and the server directly when the type of the access point is the net/web access; and
   determine whether or not the mobile email client and the server require a gateway for establishing the data link when the type of the access point is the WAP access.

10. The mobile terminal according to claim 9, wherein the one or more processors are further configured to implement a gateway connection module , configured to establish the data link between the mobile email client and the server when the mobile email client and the server require a gateway for establishing the data link.

11. The mobile terminal according to claim 10, wherein the performing module implemented by the one or more processors is further configured to determine whether or not the data exchange between the mobile email client and the server requires use of the SSL protocol;
   if yes, then a handshake negotiation is performed between the mobile email client and the server before the data exchange; and
   if not, then the data exchange is performed between the mobile email client and the server directly.

* * * * *